(12) United States Patent
Chandrasekaran et al.

(10) Patent No.: US 9,170,964 B2
(45) Date of Patent: Oct. 27, 2015

(54) USB DEVICE INTERRUPT SIGNAL

(71) Applicant: INTEL CORPORATION, Santa Clara, CA (US)

(72) Inventors: Moulishankar Chandrasekaran, Folsom, CA (US); John Valavi, Hillsboro, OR (US); James Trethewey, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 243 days.

(21) Appl. No.: 13/690,273

(22) Filed: Nov. 30, 2012

(65) Prior Publication Data

US 2014/0156895 A1    Jun. 5, 2014

(51) Int. Cl.
  *G06F 13/24*    (2006.01)
  *G06F 1/32*    (2006.01)

(52) U.S. Cl.
  CPC ................ *G06F 13/24* (2013.01); *G06F 1/325* (2013.01); *G06F 1/3215* (2013.01); *G06F 1/3253* (2013.01); *Y02B 60/1235* (2013.01)

(58) Field of Classification Search
  CPC ................................. G06F 1/325; G06F 13/24
  USPC ........................ 710/260–269; 713/300–340
  See application file for complete search history.

(56) References Cited

U.S. PATENT DOCUMENTS

| | | | |
|---|---|---|---|
| 5,864,315 A | 1/1999 | Welles et al. | |
| 5,944,831 A * | 8/1999 | Pate et al. | 713/324 |
| 7,707,447 B2 * | 4/2010 | Kim | 713/324 |
| 2008/0005423 A1 * | 1/2008 | Jacobs et al. | 710/62 |
| 2008/0234935 A1 | 9/2008 | Wolf et al. | |

FOREIGN PATENT DOCUMENTS

| | | |
|---|---|---|
| EP | 0 703 717 A1 | 3/1996 |
| JP | 2005-284596 A | 10/2005 |
| WO | 00/07346 A1 | 2/2000 |
| WO | 2014/085195 A1 | 6/2014 |

OTHER PUBLICATIONS

Chandrasekaran, et al., "Polling of I/O Devices on Host Initiated Communication Transports", U.S. Appl. No. 13/690,448, Nov. 30, 2012, 28 pages.
Chandrasekaran, et al., "Sensor Calibration", U.S. Appl. No. 13/687,731, Nov. 28, 2012, 29 pages.
Tran, et al., "Transmitting an Interrupt Packet", U.S. Appl. No. 13/682,269, Nov. 20, 2012, 26 pages.

(Continued)

*Primary Examiner* — Tim T Vo
*Assistant Examiner* — Kim T. Huynh
(74) *Attorney, Agent, or Firm* — International IP Law Group, P.L.L.C.

(57) ABSTRACT

A method and system for sending an interrupt signal is described herein. The method may include detecting sensor data in a sensor controller and detecting a powered down port between the sensor controller and an operating system. The method may also include sending the interrupt signal from the sensor controller to the operating system. In addition, the method may include detecting the operating system has provided power to the powered down port. Furthermore, the method may include sending the sensor data from the sensor controller to the operating system.

21 Claims, 5 Drawing Sheets

(56) References Cited

OTHER PUBLICATIONS

Trethewey, et al., "Multi-Function Stylus With Sensor Controller", filed U.S. Appl. No. 13/687,167, Nov. 28, 2012, 28 pages.

Trethewey, et al., "Providing Support for Display Articulation-Related Applications", filed U.S. Appl. No. 13/608,356, Sep. 10, 2012, 26 pages.

Trethewey, et al., "Providing Support for Position-Related Applications", field U.S. Appl. No. 13/608,159, Sep. 10, 2012, 30 pages.

Trethewey, et al., "Sensor and Context Based Adjustment of the Operation of a Network Controller", filed U.S. Appl. No. 13/608,419, Sep. 10, 2012, 31 pages.

Trethewey, James R., "Providing Support for Device States", U.S. Appl. No. 13/608,683, Sep. 10, 2012, 30 pages.

International Search Report and Written Opinion received for PCT Patent Application No. PCT/US2013/071261, mailed on Mar. 5, 2014, 12 pages.

\* cited by examiner

200

USB DEVICE INTERRUPT SIGNAL

TECHNICAL FIELD

This disclosure relates generally to USB device interrupt signals in a computing system and more specifically, but not exclusively, to USB device interrupt signals for a sensor controller.

BACKGROUND

Modern computing devices continue to incorporate a growing number of components. For example, modern computing devices may include sensors that can provide additional information to the computing device about the surrounding environment. In some examples, the sensors may include a Global Positioning System (also referred to herein as GPS) radio, a real-time clock, or a magnetometer. A GPS radio may detect the change in location of a computing device. In some embodiments, a real-time clock may detect the time for the computing device from various sources, such as the International Atomic Time, among others. A magnetometer may detect the direction the computing device is traveling. As the number of sensors included in a computing system increases, the amount of power to operate the sensors also increases.

DETAILED DESCRIPTION

According to embodiments of the subject matter disclosed herein, interrupt signals can be sent from a USB device to an operating system. An interrupt signal, as referred to herein, includes any logical signal that can indicate that an operating system, application, or hardware device, among others, is to perform an operation. In some embodiments, an interrupt signal can indicate that an operating system, hardware device, or application is to provide power to a USB port. For example, an operating system may save power by turning off power to a USB port when the device connected to the USB port is inactive for a period of time. In some examples, the USB port may provide power to a Human InterfaceDevice (also referred to herein as a HID device), such as a touchscreen display, a multi-function keyboard, a sensor, or a sensor controller, among others. In some embodiments, a sensor controller may send an interrupt signal to an operating system when the sensor controller detects data but cannot transmit the data to the operating system due to a USB port without power (also referred to herein as a powered down port).

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Figure 1:
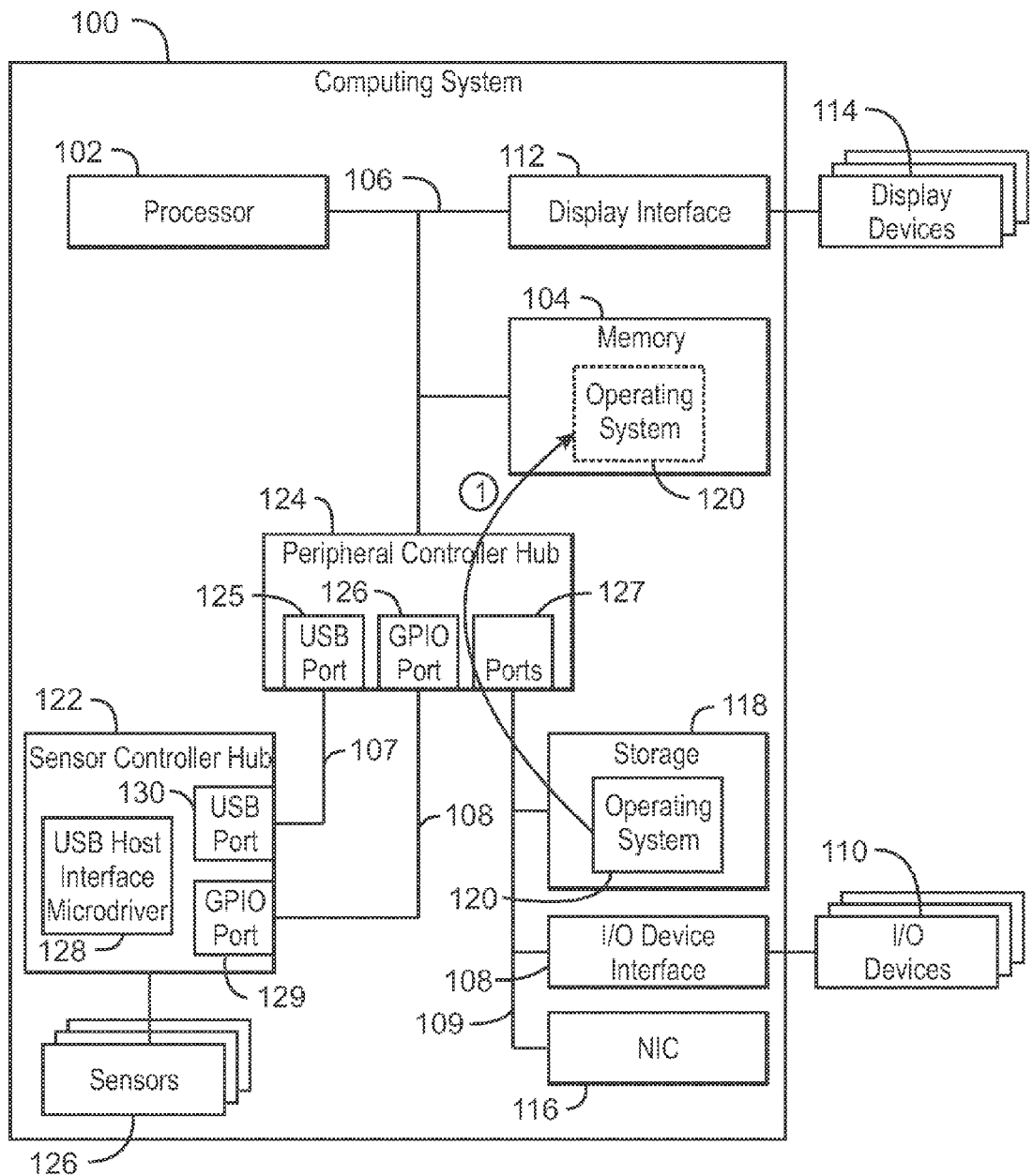
FIG. 1 is a block diagram of an example of a computing system that enables a sensor controller to send an interrupt signal to an operating system.

FIG. 1 is a block diagram of an example of a computing system that enables a sensor controller to send an interrupt signal to an operating system. The computing system 100 may be, for example, a mobile phone, laptop computer, ultrabook, desktop computer, or tablet computer, among others. The computing system 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The processor 102 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the processor 102 includes dual-core processor(s), dual-core mobile processor(s), or the like.

The memory device 104 can include random access memory (e.g., SRAM, DRAM, zero capacitor RAM, SONOS, eDRAM, EDO RAM, DDR RAM, RRAM, PRAM, eta), read only memory (e.g., Mask ROM, PROM, EPROM, EEPROM, etc.), flash memory, or any other suitable memory systems. The memory device 104 can be used to store computer-readable instructions that, when executed by the processor, direct the processor to perform various operations in accordance with embodiments described herein. For example, the instructions that are executed by the processor 102 may be used to implement a method that sends an interrupt signal. In some embodiments, the instructions that implement a method that sends an interrupt signal may be part of an operating system 120. The instructions may be loaded from a storage device 118 into a memory device 104 (as indicated by the circled 1), so that the instructions can be executed.

The processor 102 may be connected through a system interconnect 106 (e.g., processor front-side bus, or an on-die bus, among others), a peripheral controller hub 124, and a system interconnect 109 (e.g., PCI, ISA, PCI-Express®, HyperTransport®, NuInterconnect, USB, etc.) to an input/output (I/O) device interface 108 adapted to connect the computing system 100 to one or more I/O devices 110. In some embodiments, the I/O device interface 108 can send data to the peripheral controller hub (also referred to herein as a peripheral controller hub or a peripheral hub) 124 through one of the ports 127. The I/O device interface 108 can receive data from the I/O devices 110, which may include, for example, a keyboard and a pointing device, wherein the pointing device may include a touchpad or a touchscreen, among others. The I/O devices 110 may be built-in components of the computing system 100, or may be devices that are externally connected to the computing system 100.

The processor 102 may also be linked through the system interconnect 106 to a display interface 112 adapted to connect the computing system 100 to display devices 114. The display devices 114 may include a display screen that is a built-in component of the computing system 100. The display devices 114 may also include a computer monitor, television, or projector, among others, that are externally connected to the computing system 100. The processor 102 may also be linked through the system interconnect 106, peripheral controller hub 124, and system interconnect 109 to a network interface card (MC) 116. The MC 116 may be adapted to connect the computing system 100 through the system interconnect 106 to a network (not depicted). The network may be a wide area network (WAN), local area network (LAN), or the Internet, among others.

The computing device 100 may also include a storage device 118. The storage device 118 may include a physical memory such as a hard drive, an optical drive, a flash drive, an array of drives, or any combinations thereof. The storage device 118 may also include remote storage drives. The storage device 118 may also include an operating system 120. In some embodiments, the storage device 118 may store instructions thereon to receive an interrupt signal from a sensor controller (also referred to herein as a sensor controller hub or a sensor hub) 122. In some embodiments, the operating system 120 may include one or more drivers. The drivers can enable a hardware component or an application to communicate with the operating system 120, additional applications, or other hardware components of the computing device 100 including a sensor controller 122 and a peripheral controller 124. The drivers may also be used to enable a sensor controller 122 to communicate data from the sensors 126 to an application via the operating system 120, in accordance with some embodiments. In some embodiments, the drivers are part of operating system 120 and are stored in storage 113, and loaded into the memory device 104 for execution. The memory device 104 may include instructions used to process interrupt signals in a similar manner as described in reference to the operating system 120 above.

The sensor controller 122 may include a USB host interface microdriver (also referred to herein as a USB microdriver) 128. In some embodiments, the USB microdriver 128 can send an interrupt signal to the operating system 120 when the sensor controller 122 cannot communicate through the USB interconnect 107. For example, the operating system 120 may power down the USB port 125 of the peripheral controller hub (also referred to herein as a peripheral controller or a peripheral hub) 124 that allows the sensor controller 122 to communicate with the operating system 120. The sensor controller 122 may send an interrupt signal to the peripheral controller hub 124 via GPIO port 129, interrupt interconnect 108, and GPIO port 126, which may forward the interrupt signal to the operating system 120. In response to the interrupt signal, the operating system 120 can provide power to the USB port 125. The sensor controller 122 can then send data to the operating system 120.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., additional sensors, additional sensor controllers, additional interconnects connecting the sensors 126 and the sensor controller 122, etc.). Furthermore, any of the functionalities of the sensor controller 122 may be partially, or entirely, implemented in hardware and/or in the processor 102. For example, the functionality may be implemented with an application specific integrated circuit, in a USB microdriver 128 included in the sensor controller 122, in logic implemented in the processor 102, in a processor in the sensor controller 122, in a co-processor, in a sensor 126, or in any other device.

Figure 2:
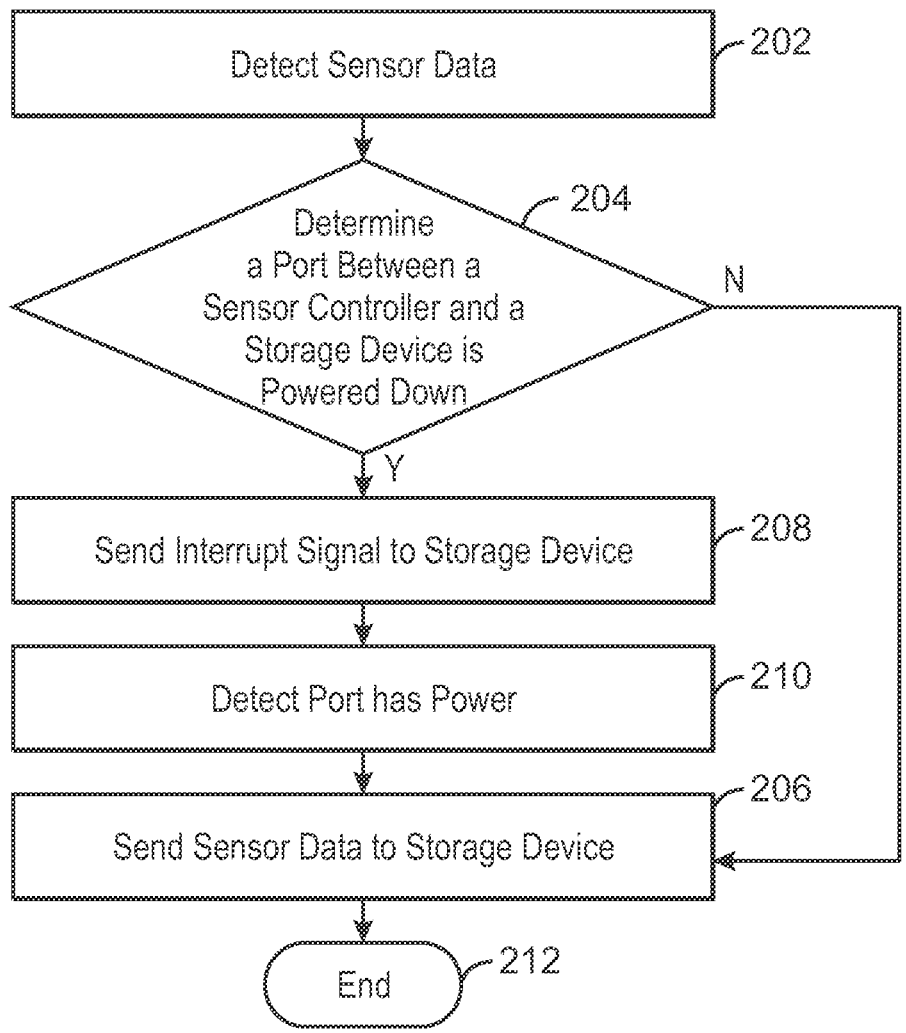
FIG. 2 is a process flow diagram for an example of sending an interrupt signal from a sensor controller to an operating system.

FIG. 2 is a process flow diagram for an example method of sending an interrupt signal from a sensor controller to an operating system. The method 200 can be implemented with a computing device, such as the computing device 100 of FIG. 1.

At block 202, the sensor controller detects sensor data. In some embodiments, the sensor data can include any data that a sensor may detect for a computing device, such as angular velocity, location, direction, or time, among others. The sensor controller can use any suitable number of sensors to collect the sensor data including a magnetometer, a GPS radio, a gyrometer, an accelerometer, or a real-time clock, among others.

At block 204, the sensor controller determines if a USB port connecting the sensor controller and an operating system has power. For example, an operating system loaded into the memory device may have powered down a USB port connecting a USB device to the peripheral controller hub in order to save power. In some examples, an operating system can save power by powering down a USB device because the operating system may constantly poll the USB device for data. For example, an operating system may continuously monitor a USB device so that the operating system can detect any data the USB device attempts to transmit to the operating system. In some embodiments, to save power, the USB device can communicate data to an operating system following an interrupt signal. In some embodiments, the sensor controller can communicate an interrupt signal with a device peripheral controller hub, which prevents constant polling of the sensor controller for data via a USB port. If the sensor controller determines that a USB port between the sensor controller and a peripheral controller hub has not been powered down, the process flow continues at block 206. If the sensor controller determines that a USB port between the sensor controller and a peripheral controller hub has been powered down, the process flow continues at block 208.

At block 208, the sensor controller sends an interrupt signal to the operating system via a peripheral controller hub. As determined at block 204, the USB port used for data transmission between the sensor controller and peripheral controller hub is powered down. In some embodiments the sensor controller can send an interrupt signal to the peripheral controller hub through a second port, such as a GPIO port, among others. As discussed above, the interrupt signal can indicate sensor data is to be transmitted between the sensor controller and the operating system. In some embodiments, the operating system can then instruct the peripheral controller hub to provide power to the USB port in response to the interrupt signal. Providing power to the USB port can allow the sensor controller to send data to an operating system. In some embodiments, the USB port may not be powered down by the operating system. Since the peripheral controller maintains power to the USB port, the sensor controller can forward data to the peripheral controller via the USB interconnect. The data can be forwarded by the peripheral controller to the operating system.

At block 210, the sensor controller detects that the USB port between the sensor controller and the peripheral controller hub has power. In some embodiments, the sensor controller can determine if the USB port has power by periodically attempting to transmit data to the peripheral controller hub via the USB port. In some examples, the sensor controller can continue to attempt to transmit data to the peripheral controller hub until data is successfully transmitted to the peripheral controller hub. In some embodiments, the sensor controller can determine if the USB port has power by examining the state of signals on the USB interconnect, such as 107 of FIG. 1, as reflected inside registers of a USB port in the sensor controller, such as 130 of FIG. 1. For example, the registers of the USB port may indicate by means of one or more status bits that the USB port is in a SUSPEND state as defined by the USB Specification promulgated by the USB Implementer's Forum.

At block 206, the sensor controller sends sensor data to the operating system. For example, the sensor controller can send sensor data collected from any suitable number of sensors to the operating system. In some examples, the sensor controller can also combine sensor data from any suitable number of sensors and send the aggregated sensor data to the operating system. For example, the sensor controller may perform a calculation based on sensor data from a magnetometer, a gyrometer, and a GPS radio, or any suitable combination of sensors. In some examples, the sensor controller may calculate a cardinal direction the computing device is traveling, an angular velocity of the computing device, or a location of the computing device, among others. In some embodiments, the sensor controller can transmit the result of the calculation to the operating system as sensor data. In other embodiments, the sensor controller may transmit the sensor data from any suitable number of sensors and an operating system may perform a calculation based on the sensor data. After the sensor controller sends sensor data to the operating system, the process flow ends at block 212.

The process flow diagram of FIG. 2 is not intended to indicate that the steps of the method 200 are to be executed in any particular order, or that all of the steps of the method 200 are to be included in every case. Further, any number of additional steps may be included within the method 200, depending on the specific application. For example, the sensor controller may send sensor data for any suitable number of sensors sequentially to an operating system after the USB port between the sensor controller and the storage device has power. In some embodiments, an operating system may power down a USB port after the sensor controller has transmitted a particular amount of sensor data. For example, a sensor controller may indicate to an operating system that a certain number of bytes of sensor data are to be transmitted and after the bytes of data are transmitted, the operating system can power down the USB port that is used for communication by the sensor controller.

Figure 3A:
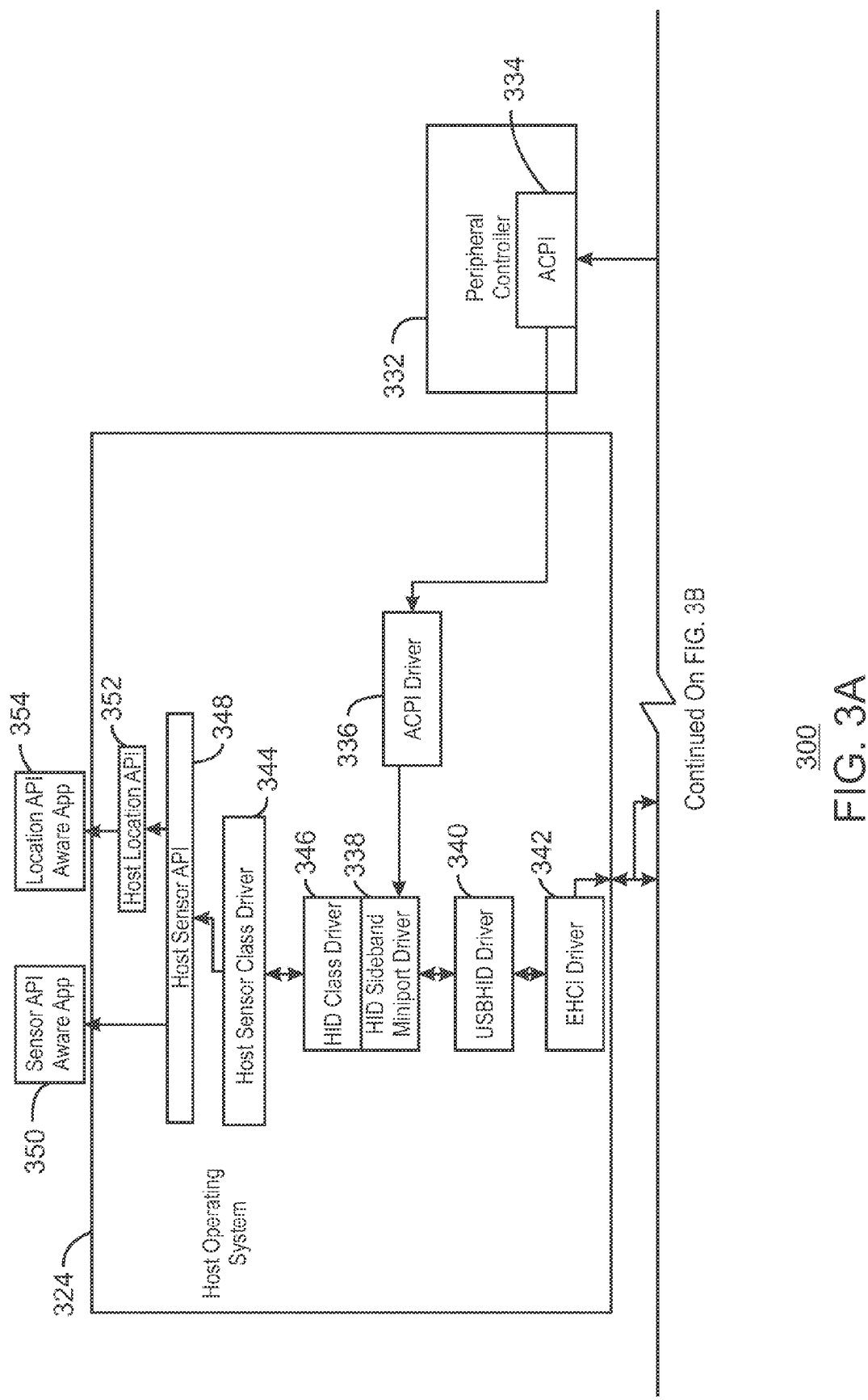
FIGS. 3A and 3B are block diagrams of an example of a sensor controller sending an interrupt signal to an operating system.
Figure 3B:
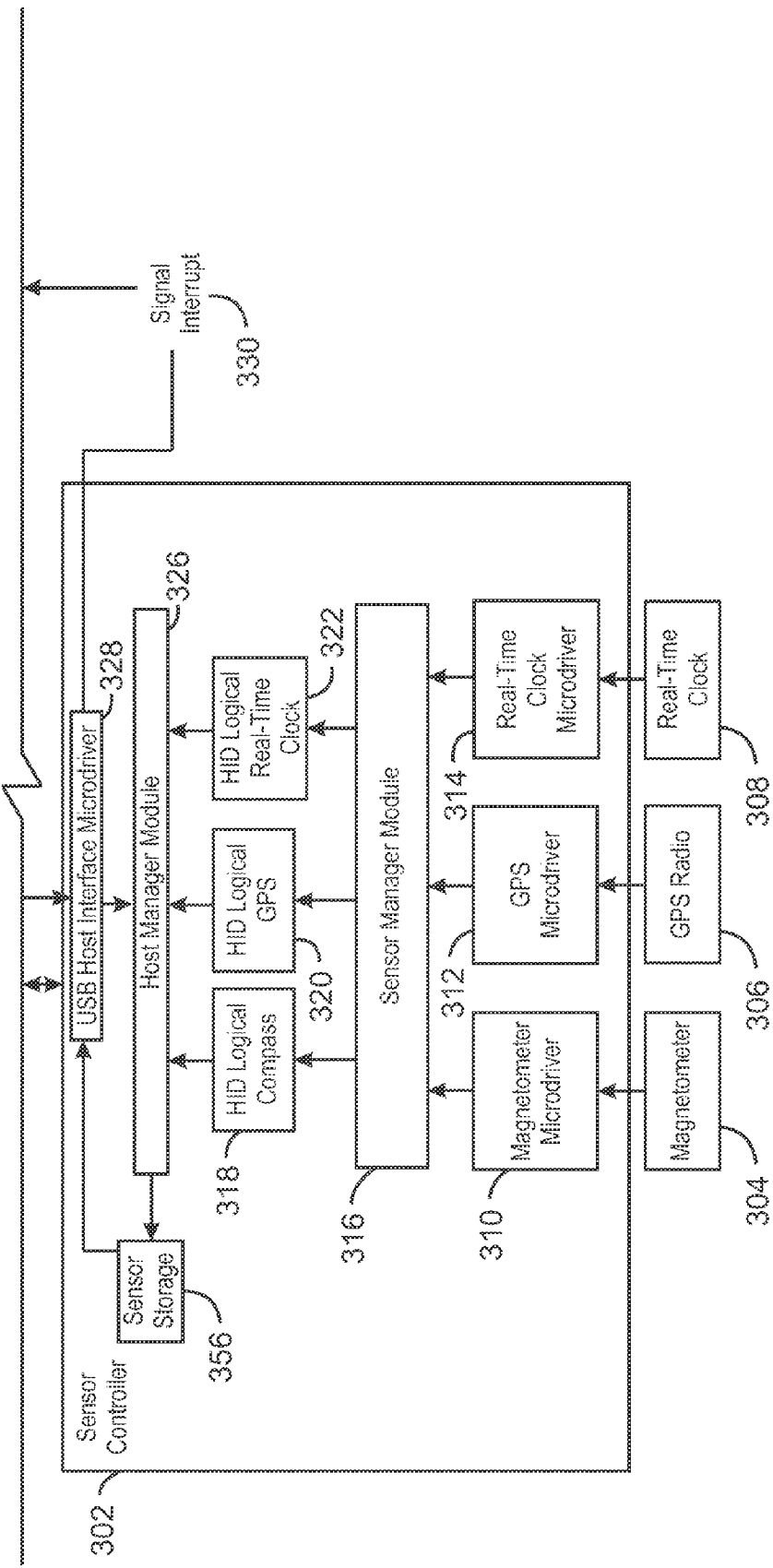

FIGS. 3A and 3B are block diagrams of an example of a sensor controller sending an interrupt signal to an operating system. In some embodiments, the sensor controller 302 can communicate with any suitable number of sensors, such as a magnetometer 304, a GPS radio 306, and a real-time clock 308, among others. The magnetometer 304 can detect data related to the strength or direction of magnetic fields. The GPS radio 306 can detect data related to the location of a computing device. For example, the GPS radio 306 may detect the latitude and longitude of a computing device. The real-time clock 308 can detect the time, such as the International Atomic Time, among others, from a standard time source.

In some embodiments, the sensor controller 302 can include any suitable number of microdrivers that can communicate with any suitable number of sensors. For example, the sensor controller 302 may include a magnetometer microdriver 310, a GPS radio microdriver 312, and a real-time clock microdriver 314. The magnetometer microdriver 310, GPS radio microdriver 312, and real-time clock microdriver 314 may include firmware that can enable communication between the sensors and a sensor manager module 316. For example, the magnetometer microdriver 310 may include firmware that can detect data from a particular magnetometer sensor 304 and forward the data from the magnetometer sensor 304 to the sensor manager module 316. In some embodiments, the GPS radio microdriver 312 may include firmware that can detect data from a particular GPS radio 306 and forward the data from the GPS radio 306 to the sensor manager module 316. In some embodiments, the real-time clock microdriver 314 may include firmware that can detect data from a particular real-time clock 308 and forward the data from the real-time clock 308 to the sensor manager module 316.

In some embodiments, the sensor manager module 316 may analyze data gathered by one or more of the sensors 304, 306, and 308. For example, the sensor manager module 316 may determine position data or angular velocity data, among others, for a computing device based on data received from one or more of the sensors 304, 306, and 308 through one or more of the microdrivers 310, 312, and 314.

The sensor controller 302 may also include one or more HID logical devices 318, 320, and 322. In some embodiments, the HID logical devices may include a HID logical compass 318, a HID logical GPS 320, and a HID real-time clock 322, among others. The HID logical devices 318, 320, and 322 may be configured to format the data received by the sensor manager module 316. For example, the sensor controller 302 may format data received from one or more of the sensors 304, 306, and 308 by packaging the data to enable the operating system 324 to detect individual sensor data transmitted through a single system interconnect, such as a bus. In some embodiments, one or more of the HID logical devices 318, 320, and 322 can enable the sensor controller 302 to format data to enable the operating system 324 to detect individual sensors according to HID specifications.

The sensor controller 302 may also include a host manager module 326 that can aggregate data received from the HID logical compass 318, the HID logical GPS 320, and the HID logical real-time clock 322. For example, the host manager module 326 may aggregate data, such as position data, among others, detected by the sensors 304, 306, and 308 and send the aggregated data to the operating system 324. In some embodiments, the host manager module 316 aggregates the formatted HID and non-vendor specific data to enable the sensor controller 302 to provide the formatted data to the operating system 324 via a single channel. By providing the formatted position data to the operating system 324 via a single channel, such as a USB bus, individual communication interfaces from each of the one or more sensors 304, 306, and 308 can be eliminated. Transmitting sensor data from one or more sensors 304, 306, and 308 via a single channel can enable a relatively simple interface between one or more sensors 304, 306, and 308 and the operating system 324.

The sensor controller 302 may also include a USB host interface microdriver (also referred to herein as a USB microdriver) 328 that can transmit the data from the host manager module 326 to the operating system 324. In some embodiments, the USB microdriver 328 can detect that a USB port between the sensor controller 302 and the operating system 324 does not have power. In response to detecting that a USB port does not have power, the USB microdriver 328 can send an interrupt signal 330 to a peripheral controller 332. In some embodiments, the peripheral controller 332 can include an advanced configuration and power interface also referred to herein as ACPI) 334. The ACPI 334 can forward power management information regarding the sensor controller 302 to the operating system 324 through the ACPI driver 336. In some embodiments, the ACPI driver 336 can send the interrupt signal 330 to the HID sideband Miniport driver 338 (also referred to herein as a sideband driver), which can control power to a USB port through the USBHID driver 340 and the EHCI (USB Enhanced Host Controller Interface) driver 342. For example, the sideband driver 338 can detect a period of inactivity from a device connected to the operating system 324 through a USB port. In some embodiments, the sideband driver 338 can turn off power to a USB port in response to a period of inactivity from a device connected to the USB port. The sideband driver 338 can also provide power to a USB port in response to detecting an interrupt signal 330 from the ACPI driver 336.

If the USB port has power, the USB microdriver 328 can send sensor data the host sensor class driver 344 through the HID class driver 346. The host sensor class driver 344 can then send the sensor data to a host sensor API 348, which can send the sensor data to a sensor API aware application 350 or a host location API 352 and a location API aware application 354.

In some embodiments, the sensor controller 302 can store sensor data in sensor storage 356. For example, the sensor controller 302 can store data in sensor storage 356 for any suitable number of sensors, such as the magnetometer 304, the GPS radio 306, or the real-time clock 308. In some embodiments, the sensor storage 356 can store sensor data for each sensor in a separate data structure, such as a linked list, a vector, an array, or a queue. For example, the sensor data for a magnetometer 304 may be stored in a different data structure than the sensor data for the GPS radio 306.

In some embodiments, the USB microdriver 328 can send a message to the host sensor class driver 344. The message can indicate which data structures currently store data that is to be transmitted from the sensor controller 302 to the operating system 324. For example, the message may indicate that sensor data for the magnetometer 304 is stored in a data structure in the sensor storage 356. The sensor data for the magnetometer 304 may be transmitted to the operating system 324 through the USB microdriver 328 when the USB microdriver 328 determines the port between the sensor controller 302 and the operating system 324 has power.

It is to be understood that the block diagram of FIG. 3 is not intended to indicate that the sensor controller 302 or the operating system 324 is to include all of the components shown in FIG. 3. Rather, the sensor controller 302 and the operating system 324 can include fewer or additional components not illustrated in FIG. 3 (e.g., additional sensors, additional drivers, etc.).

Figure 4:
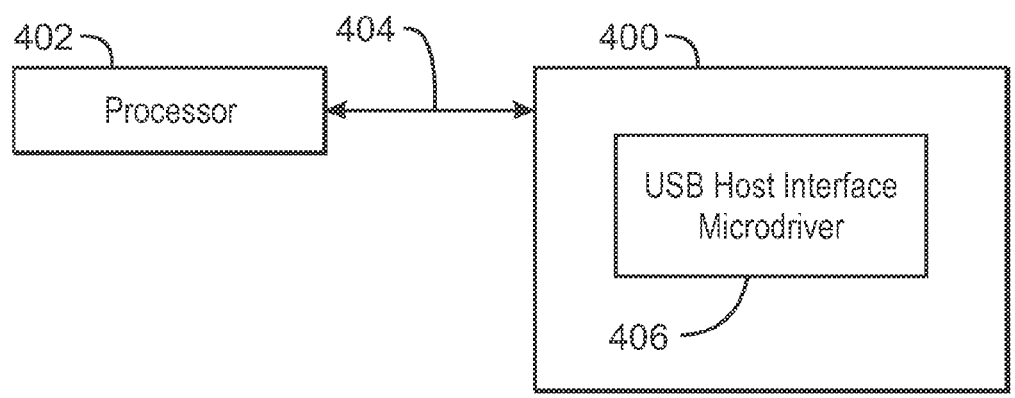
FIG. 4 is a tangible, non-transitory computer-readable medium that can enable a sensor controller to send an interrupt signal to an operating system.

FIG. 4 is a tangible, non-transitory computer-readable medium that can enable a sensor controller to send an interrupt signal to an operating system. The tangible, non-transitory, computer-readable medium 400 may be accessed by a processor 402 over a computer interconnect 404. Furthermore, the tangible, non-transitory, computer-readable medium 400 may include code to direct the processor 402 to perform the steps of the current method.

The various software components discussed herein may be stored on the tangible, non-transitory, computer-readable medium 400, as indicated in FIG. 4. For example, a USB host interface microdriver 406 may be adapted to direct the processor 402 to send an interrupt signal to a storage device, operating system, application, or hardware device, among others. In some embodiments, the interrupt signal can be sent to a second controller, which can forward the interrupt signal to any suitable device or application, such as an operating system or application, among others. It is to be understood that any number of additional software components not shown in FIG. 4 may be included within the tangible, non-transitory, computer-readable medium 400, depending on the specific application.

EXAMPLE 1

A method for sending an interrupt signal is described herein. The method can include detecting sensor data in a sensor controller and detecting a powered down port between the sensor controller and an operating system. The method can also include sending the interrupt signal from the sensor controller to the operating system. In addition, the method can include detecting the operating system has provided power to the powered down port. Furthermore, the method can include sending the sensor data from the sensor controller to the operating system.

In some embodiments, the method can send the interrupt signal from the sensor controller to a second controller, wherein the second controller forwards the interrupt signal to the operating system. In some examples, the operating system may reside in a storage or memory device, such as volatile or non-volatile storage. Additionally, in same embodiments, the second controller may be a peripheral controller.

EXAMPLE 2

A system for sending an interrupt signal is described herein. The system includes a sensor controller that detects sensor data from a sensor, a processor that executes computer-readable instructions, and a storage device that stores computer-readable instructions. The computer-readable instructions can direct a processor to detect sensor data in the sensor controller and detect a powered down port between the sensor controller and the peripheral controller. The computer-readable instructions can also direct a processor to send the interrupt signal from the sensor controller to the operating system. In addition, the computer-readable instructions can direct a processor to detect the powered down port is no longer powered down and send the sensor data from the sensor controller to the operating system.

In some embodiments, the processor can reside in a computing device. Alternatively, the processor can reside in the sensor controller. In some embodiments, the computer-readable instructions can direct a processor to send a message from the sensor controller to the operating system that indicates a sensor has detected the sensor data. In some examples, the sensor controller stores the sensor data in a queue for a particular sensor. For example, the sensor controller may include a plurality of queues, wherein each of the plurality of queues stores data for one or more sensors.

EXAMPLE 3

At least one non-transitory machine readable medium having a plurality of instructions stored thereon is described herein. In response to being executed on a computing device, the instructions cause the computing device to detect sensor data in a sensor controller. The instructions also cause the computing device to detect a powered down port between the sensor controller and an operating system. Additionally, the instructions cause the computing device to send the interrupt signal from the sensor controller to the operating system through a second controller, wherein the second controller forwards the interrupt signal to the operating system. Furthermore, the instructions cause the computing device to detect the operating system has provided power to the powered down port, and send the sensor data from the sensor controller to the operating system.

In some embodiments, the instructions can cause the computing device to store sensor data for any suitable number of sensors. In some examples, the sensors may include a magnetometer, a GPS radio, or a real-time clock. In some embodiments, the sensor data may be aggregated and sent to a computing device once a USB port receives power.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element that does not preclude there being more then one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method for sending an interrupt signal comprising:
   detecting sensor data in a sensor controller, the sensor controller collecting the sensor data during a period of time in which a port between the sensor controller and an operating system is powered down;
   sending the interrupt signal from the sensor controller to the operating system through a second controller, wherein the second controller forwards the interrupt signal to the operating system;
   detecting the operating system has provided power to the powered down port; and
   sending the sensor data from the sensor controller to the operating system.

2. The method of claim 1, wherein the second controller is a peripheral controller.

3. The method of claim 1 comprising sending a message from the sensor controller to the operating system that identifies a sensor as the source of the sensor data.

4. The method of claim 3, wherein the sensor controller stores the sensor data in a queue for said sensor.

5. The method of claim 4, wherein the sensor controller comprises a plurality of queues, wherein each of the plurality of queues stores data for a sensor.

6. The method of claim 1, wherein the sensor data comprises data detected by a magnetometer, a GPS radio, or a real-time clock.

7. A system for sending an interrupt signal comprising:
   a sensor controller that detects sensor data from a sensor; and
   a processor to:
     detect sensor data in the sensor controller, the sensor controller to collect the sensor data during a period of time in which a port between the sensor controller and an operating system is powered down;
     send the interrupt signal from the sensor controller to the operating system through a second controller, wherein the second controller is to forward the interrupt signal to the operating system;
     detect the powered down port is no longer powered down; and
     send the sensor data from the sensor controller to the operating system.

8. The system of claim 7, wherein the operating system resides in a storage device or in a memory device.

9. The system of claim 7, wherein the processor resides in a computing device.

10. The system of claim 7, wherein the processor resides in the sensor controller.

11. The system of claim 7, wherein the second controller is a peripheral controller.

12. The system of claim 10, wherein the processor is to send a message from the sensor controller to the operating system that identifies the sensor as the source of the sensor data.

13. The system of claim 7, wherein the sensor controller stores the sensor data in a queue corresponding to the sensor.

14. The system of claim 13, wherein the sensor controller comprises a first queue and a second queue, wherein the first queue stores data for a first sensor and the second queue stores data for a second sensor.

15. The system of claim 7, wherein the sensor data comprises data detected by a magnetometer, a GPS radio, or a real-time clock.

16. At least one non-transitory machine readable medium comprising a plurality of instructions that, in response to being executed on a computing device, cause the computing device to:
- detect sensor data in a sensor controller, the sensor controller to collect the sensor data during a period of time in which a port between the sensor controller and an operating system is powered down;
- send an interrupt signal from the sensor controller to the operating system through a second controller, wherein the second controller forwards the interrupt signal to the operating system;
- detect the operating system has provided power to the powered down port; and
- send the sensor data from the sensor controller to the operating system.

17. The non-transitory machine readable medium of claim 16, wherein the plurality of instructions cause the processor to send a message from the sensor controller to the operating system that identifies a sensor as the source of the sensor data.

18. The non-transitory machine readable medium of claim 16, wherein the sensor controller stores the sensor data in a queue for said sensor.

19. The non-transitory machine readable medium of claim 18, wherein the sensor controller comprises a plurality of queues, wherein each of the plurality of queues stores data for a sensor.

20. The non-transitory machine readable medium of claim 16, wherein the sensor data comprises data detected by a magnetometer, a GPS radio, or a real-time clock.

21. The system of claim 7, wherein the processor is to power down the port in response to the sensor controller transmitting a predetermined amount of sensor data.

* * * * *